(12) United States Patent
Henry

(10) Patent No.: US 7,025,485 B2
(45) Date of Patent: Apr. 11, 2006

(54) HIGH MOUNT STOP LAMP WITH PRINTED CIRCUIT BOARD

(75) Inventor: Jamison M. Henry, Lapel, IN (US)

(73) Assignee: Guide Corporation, Pendleton, IN (US)

(*) Notice: Subject to any disclaimer, the term of this patent is extended or adjusted under 35 U.S.C. 154(b) by 103 days.

(21) Appl. No.: 10/696,224

(22) Filed: Oct. 29, 2003

(65) Prior Publication Data

US 2005/0094412 A1   May 5, 2005

(51) Int. Cl.
    *F21S 8/10* (2006.01)
(52) U.S. Cl. ........................ 362/545; 362/249
(58) Field of Classification Search ........... 362/540, 362/544, 545, 800, 227, 240, 249, 308–310, 362/311; 248/317
    See application file for complete search history.

(56) References Cited

U.S. PATENT DOCUMENTS

| | | | |
|---|---|---|---|
| 3,969,721 A | 7/1976 | Chadwick et al. | |
| 5,062,027 A * | 10/1991 | Machida et al. | 362/541 |
| 5,388,035 A * | 2/1995 | Bodem, Jr. | 362/545 |
| 5,434,750 A | 7/1995 | Rostoker et al. | |
| 5,871,784 A | 2/1999 | Assink et al. | |
| 6,149,288 A * | 11/2000 | Huang | 362/545 |
| 6,502,956 B1 | 1/2003 | Wu | |
| 6,533,445 B1 * | 3/2003 | Rogers | 362/540 |
| 6,641,284 B1 * | 11/2003 | Stopa et al. | 362/240 |
| 2001/0009510 A1 | 7/2001 | Lodhie | |
| 2003/0043590 A1 | 3/2003 | Walsher et al. | |
| 2003/0095398 A1 | 5/2003 | Parker et al. | |
| 2004/0240226 A1 * | 12/2004 | Gross et al. | 362/544 |
| 2005/0006548 A1 * | 1/2005 | Goh et al. | 248/317 |
| 2005/0052864 A1 * | 3/2005 | Colip et al. | 362/236 |

FOREIGN PATENT DOCUMENTS

| | | |
|---|---|---|
| CN | 1381904 A | 11/2002 |
| GB | 2 348 324 | 9/2000 |
| JP | 62193184 | 8/1987 |
| JP | 04044368 A | 2/1992 |
| JP | 7226537 A2 | 8/1995 |
| JP | 9101752 A2 | 4/1997 |
| JP | 2001338723 A2 | 12/2001 |
| TW | 0479378 B | 3/2002 |
| WO | WO 03/038335 A1 | 5/2003 |
| WO | WO 03/066374 A2 | 8/2003 |

* cited by examiner

*Primary Examiner*—Stephen Husar
*Assistant Examiner*—Hargobind S. Sawhney
(74) *Attorney, Agent, or Firm*—Ice Miller LLP

(57) ABSTRACT

A thin automobile lamp assembly is manufactured by first fixing an elongated printed circuit board (PCB) having a plurality of LEDs to an elongated inner lens before the inner lens and PCB are joined to any other parts. The inner lens is fixed to the PCB by contacting the inner lens and the PCB such that a plurality of stakes on the inner lens extend through a plurality of associated holes on the PCB. The stakes extending through the holes are then melted by a process such as heat staking to fix the PCB to the inner lens. The fixed relationship between the inner lens and the PCB board secures a proper alignment between the lens and the plurality of LEDs on the PCB. Next, the PCB and lens subassembly is joined to a lamp housing, and the entire assembly is secured to an automobile.

16 Claims, 3 Drawing Sheets

HIGH MOUNT STOP LAMP WITH PRINTED CIRCUIT BOARD

BACKGROUND

A desireable feature for modern automobile lamp assemblies is a thin design. A thin design provides the designer of the automobile with additional space in the engine and trunk compartments where lamp cavities were traditionally required. Such thin designs have become more achievable with the advent of the light emitting diode (LED) in automotive lamps. Specifically, LEDs are smaller than traditional incandescent or halogen automotive lamps. In addition, LEDs can be mounted on printed circuit boards or similar thin structures and do not require relatively thick sockets and wire harness assemblies directly behind the lamp. Accordingly, automotive lamp designs that use LEDs as the light source are typically thinner and smaller than traditional automotive lamp designs.

One typical thin lamp design using LEDs includes an elongated lamp housing that supports a printed circuit board (PCB) containing a plurality of LEDs. An elongated inner lens is positioned near to the PCB to cover the LEDs and complete assembly of the thin lamp. Because the lens is positioned so close to the LEDs, the lens must be precisely fit on to the PCB so the LEDs are properly focused by the lens. However, past thin lamp designs have typically involved connection of the housing, PCB and lens using fasteners that extend to or through all three components. Unfortunately, connection of other parts when joining the PCB and the lens often causes some misalignment of the LEDs with respect to the lens.

SUMMARY

A thin automobile lamp comprises an elongated printed circuit board having a plurality of LEDs positioned across the printed circuit board. An elongated inner lens is connected to the printed circuit board and covers the LEDs on the printed circuit board. The printed circuit board and lens are joined to an elongated lamp housing, and an outer lens is positioned over the housing, covering the inner lens.

The method of assembling the thin automobile lamp involves first fixing the elongated inner lens to the elongated printed circuit board to form a PCB subassembly. The lens is fixed to the printed circuit board by first contacting the inner lens and the printed circuit board such that a plurality of stakes on the inner lens extend through a plurality of associated holes on the printed circuit board. The stakes extending through the holes are then melted by a process such as heat staking to fix the printed circuit board to the inner lens. The fixed relationship between the inner lens and the printed circuit board secures a proper alignment between the lens and the plurality of LEDs on the printed circuit board, such that movement of the PCB subassembly or connection of the PCB subassembly to other parts does not disturb the fixed relationship between the LEDs and the inner lens.

Next, the PCB subassembly is joined to the lamp housing by placing the PCB subassembly in a channel of the lamp housing. When the PCB subassembly is placed in the channel, a plurality of stakes on the lamp housing extend through a plurality of associated holes on the PCB subassembly. The stakes extending through the plurality of holes are then melted by a process such as heat staking to fix the PCB subassembly to the lamp housing. The outer lens is placed over the lamp housing to cover the inner lens. The lamp assembly may then be positioned upon on automobile. In one embodiment of the invention, the lamp assembly serves as a center high mount stop lamp (CHMSL).

DESCRIPTION

Figure 1:
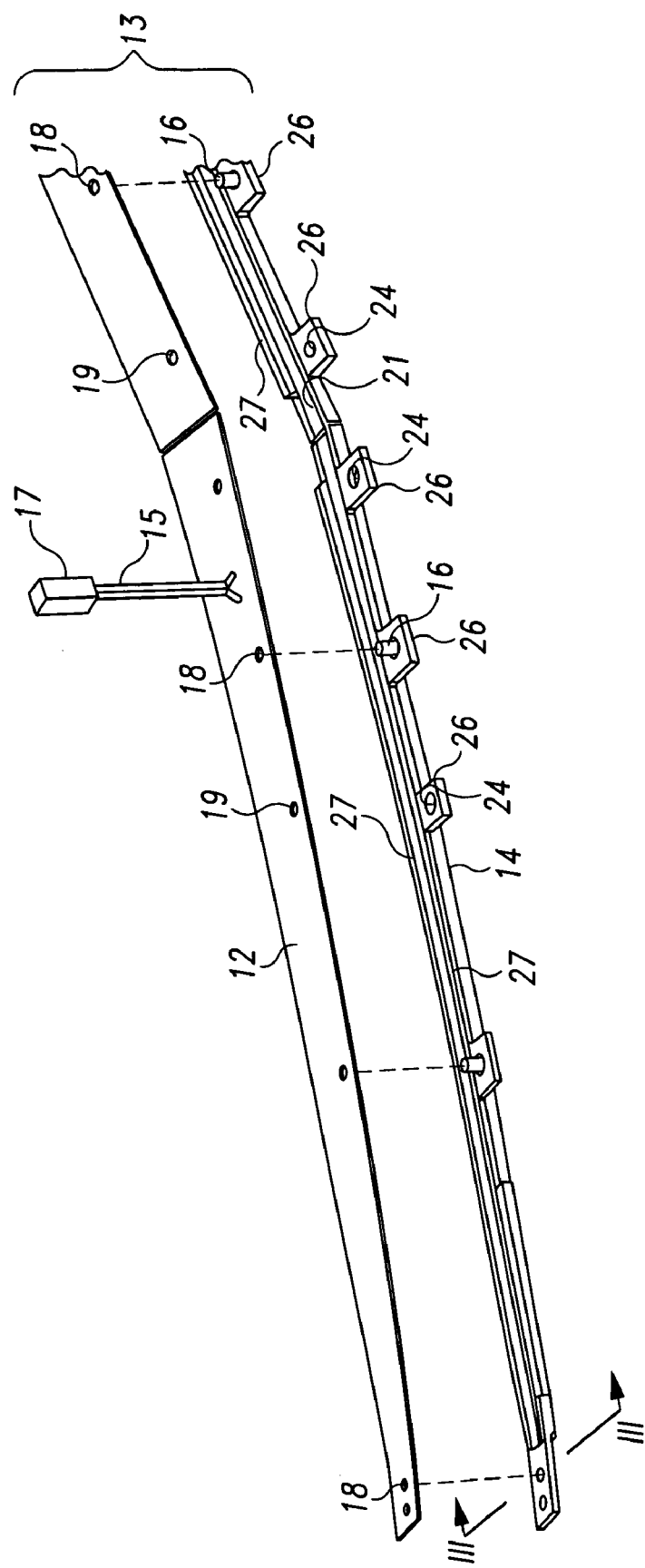
FIG. 1 is a perspective view of a printed circuit board subassembly in expanded isometric format, including a printed circuit board and lens.
Figure 2:
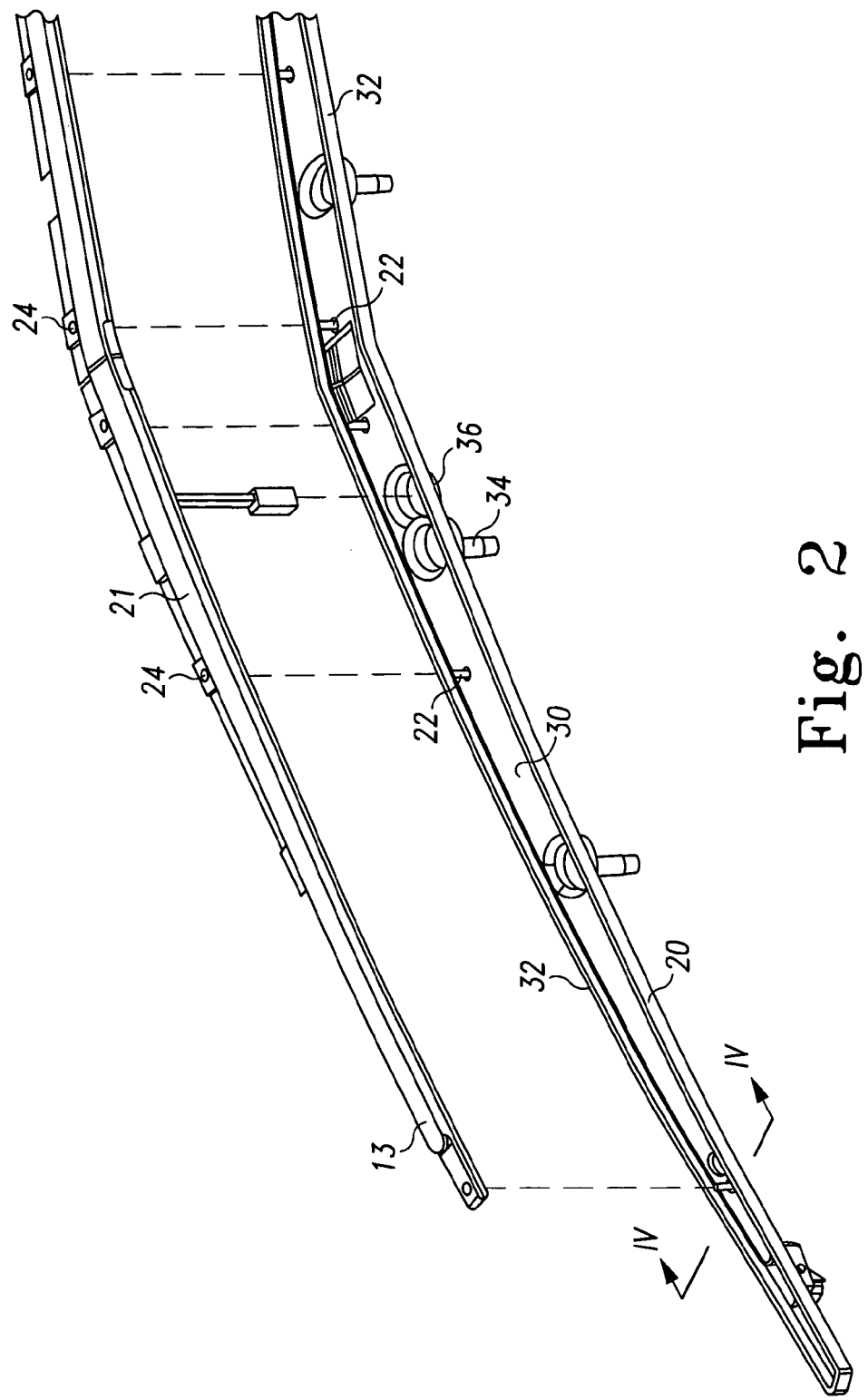
FIG. 2 is a perspective view of a High Mount Stop Lamp With Printed Circuit Board in expanded isometric format, including the printed circuit board subassembly of FIG. 1 and a lamp housing.

As shown in FIGS. 1 and 2, a High Mount Stop Lamp With Printed Circuit Board 10 is an automotive lamp assembly that generally includes an elongated printed circuit board (PCB) 12 fixed to an elongated inner lens 14. The PCB 12 has a plurality of LEDs (not shown) positioned thereon. The PCB and inner lens together form a PCB subassembly. The PCB subassembly is fixed to an elongated lamp housing 20. The elongated lamp housing 20 is secured to an automobile, and, in one embodiment, the High Mount Stop Lamp With Printed Circuit Board 10 is used as a center high mount stop lamp (CHMSL) for an automobile.

With reference to FIG. 1, the elongated PCB 12 includes a plurality of light emitting diodes (LEDs) (not shown) spaced apart on the surface of the PCB. Only the reverse side of the PCB is shown in FIG. 1. The LEDs are generally mounted to the front side of the PCB and are oriented to emit light toward the inner lens 14. Each of the plurality of LEDs are joined to electrical circuit traces (not shown) on the PCB. The electrical circuit traces connect the LEDs to lead wires 15 connected to the printed circuit board. The lead wires are joined to the automobile's electrical system through a plug 17 on the end of the lead wires. The PCB also includes a plurality of holes spaced along the length of the PCB. The plurality of holes include a first plurality of holes 18 and a second plurality of holes 19. The first plurality of holes 18 are typically smaller in diameter than the second plurality of holes 19.

The elongated inner lens 14 includes a lens portion 21 bounded by two sidewalls 27, and a plurality of tabs 26 extending from the sidewalls. The lens portion includes a plurality of prescriptions located side-by-side across the length of the elongated inner lens. Each prescription is designed to distribute the light from an associated LED on the PCB in a predetermined manner. Each prescription generally includes a single focal point or other precise position behind the lens where the LED should be located in order to correctly distribute the light from the LED. Therefore, the PCB and inner lens must be precisely fitted together and fixed relative to each other to make sure that each LED is properly positioned with respect to each lens prescription. The lens 14 is transparent or translucent, and, as mentioned above, includes a plurality of prescriptions. The elongated lens is generally a single molded piece formed from a polymer material.

Figure 3:
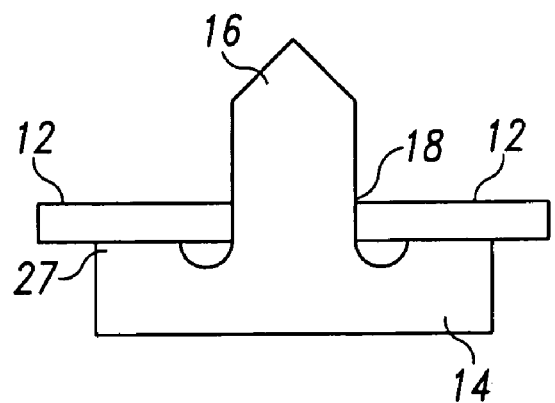
FIG. 3 is a cross-sectional view of a stake of the lens along line III—III of FIG. 1, with the printed circuit board positioned against the lens.

Each of the plurality of tabs 26 on the elongated inner lens 14 includes either a hole 24 or a stake 16. The holes 24 are similar or slightly smaller in size to the second plurality of holes 19 on the PCB. The stakes 16 are designed to fit snugly into the first plurality of holes 18 on the PCB. FIG. 3 shows a cross-sectional view of the PCB 12 placed upon the lens 14 with one of the stakes 16 extending through one of the first plurality of holes 18 (e.g., the cross-sectional view along line III—III of FIG. 1 with the PCB inserted on the lens). As shown in FIG. 3, the PCB is inserted fully on the stake such that the PCB rests against the sidewalls 27 of the lens with the LEDs positioned on the PCB oriented to emit light through the lens 14. As described in more detail below, the stake 16 is melted by a heat staking or other process to fixedly secure the PCB and lens. Accordingly, each stake 16 is capped by the heat stake process such that the stake terminates in the cap (not shown) and the stake extends exclusively between the PCB 12 and the inner lens 14.

Figure 4:
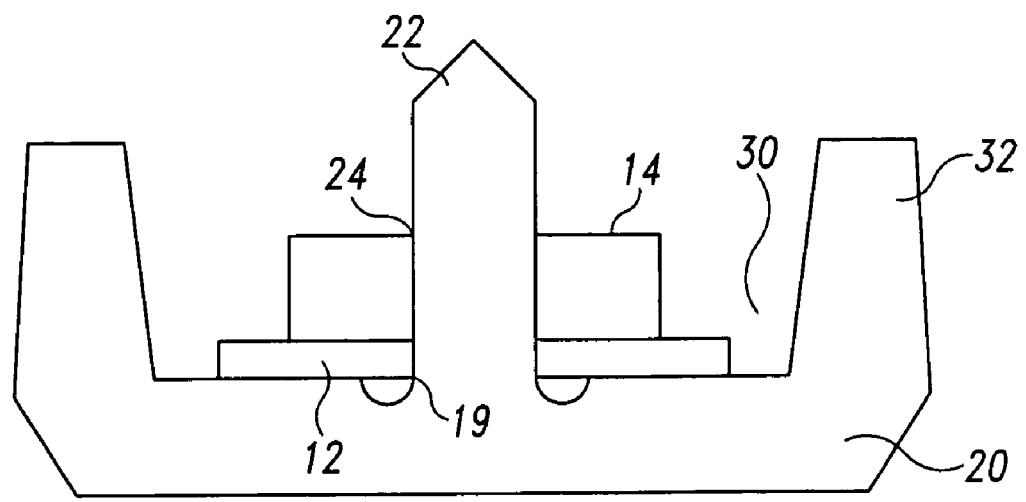
FIG. 4 is a cross-sectional view of a stake of the lamp housing along line IV—IV of FIG. 2, with the printed circuit board subassembly positioned against the lamp housing.

With reference to FIG. 2, the elongated lamp housing 20 is a molded piece formed from a polymer material. The lamp housing generally includes a center channel 30 designed to receive the inner lens and PCB. The center channel is bounded by two sidewalls 32 extending along the length of the housing. A plurality of stakes 22 are spaced apart within the channel 30 of the housing 20 and extend forwardly from the channel of the housing. The stakes 22 are designed to fit snugly in the holes 24 on the tabs 26 of the inner lens 14. The stakes 22 fit easily through the second plurality of holes 19 on the PCB. As shown in FIG. 4, when the PCB 12 and lens 14 are positioned upon the lamp housing the back side of the PCB 12 rests against the lamp housing 20 in the channel 30 of the lamp housing. The stake 22 fits loosely into the hole 19 of the PCB and snugly in the hole 24 of the lens. As described in more detail below, the stake 22 is melted by a heat staking or other process to fixedly secure the lens and PCB to the lamp housing. Accordingly, each stake 22 is capped by the heat stake process such that the stake terminates in the cap (not shown) and the stake extends from the lamp housing 20, through the PCB 12 and the inner lens 14.

Referring again to FIG. 2, the housing 20 also includes a plurality of mounting brackets/posts 34 that extend from the rear of the housing 20. The mounting brackets/posts are used to secure the housing to an automobile. A passage 36 is also found in the channel 30 of the housing 20. The passage 36 allows the lead wires 15 to extend through the channel of the housing and out the rear of the housing where the lead wires may be connected to the automobile electrical system.

Assembly of the High Mount Stop Lamp With Printed Circuit Board is now describe with respect to FIGS. 1–4. The assembly process involves first fixing the PCB 12 to the inner lens 14, as indicated in FIG. 1. This is accomplished by heat staking the PCB 12 to the lens 14 once the stakes 16 are inserted into the first plurality of holes 18 on the PCB. The heat staking process involves application of heat to the stakes 16, melting them at least somewhat against the PCB, and thereby tightly securing the PCB against the lens. As mentioned previously, a very precise alignment between the PCB 12 and the lens 14 is desirable because the LEDs on the PCB must be precisely aligned with the prescriptions on the lens. If the LEDs are not properly aligned, the light distribution from the lamp assembly will not be optimal and may fall outside of the specifications for the lamp. By fixing the PCB containing the LEDs directly to the lens, there is less chance that the LEDs will be misaligned than if additional parts are joined to the lamp assembly before the PCB and lens are affixed. Joining the PCB to the lens forms a PCB subassembly 13.

Next, the PCB and lens subassembly 13 is joined to the housing 20 as indicated in FIG. 2. To accomplish this, the stakes 22 of the lamp housing 20 are inserted through the holes 24 on the lens (which are also aligned with the holes 19 on the PCB). Then, the PCB subassembly and lamp housing 20 are heat staked together by applying heat to the stakes 24 and at least partially melting the stakes against the lens 14, resulting the PCB subassembly being fixed to the lamp housing. Finally, an outer lens (not shown) may be attached to lamp housing to cover the inner lens. The outer lens may be purely decorative, may serve to provide a sealed chamber where the PCB subassembly is located, or may serve both purposes.

Although the present invention has been described in considerable detail with reference to certain preferred versions thereof, other versions are possible. For example instead of heat staking the PCB and inner lens, other attachment methods could be used such as vibration or sonic welding, adhesives, screws or any other attachment method known in the art for securely fixing two automotive parts together. In another alternative embodiment of the invention, the stakes on the lens could be positioned upon the PCB, or the stakes on the lamp housing could be positioned upon the lens. Furthermore, the second plurality of holes that receive the stakes from the lamp housing could be removed and cut-out portions could be used instead. Therefore, the spirit and scope of the appended claims should not be limited to the description of the preferred versions contained herein.

What is claimed is:

1. A method of manufacturing an automotive lamp comprising a lens, a printed circuit board having at least one of LED, and a lamp housing, the method comprising the steps of:
    a. fixing the lens to the printed circuit board to form a PCB subassembly, the fixed relationship between the lens and the printed circuit board thereby securing a proper alignment between the lens and the at least one LED on the printed circuit board; and
    b. fixing the PCB subassembly to the lamp housing;
    c. wherein the lens is fixed to the printed circuit board by first contacting the lens and the printed circuit board such that a plurality of stakes, mounted on the lens, extend through a plurality of associated holes in the circuit board, and then melting the plurality of stakes extending through the plurality of holes; and
    d. wherein the PCB subassembly is fixed to the lamp housing by first contacting the PCB subassembly and the lamp housing such that a plurality of stakes, mounted on the housing, extend through a plurality of associated holes in the circuit board, and then melting the plurality of stakes extending through the plurality of holes.

2. The method of claim 1 further comprising the step of fixing the lamp housing to an automobile.

3. The method of claim 1 wherein heat staking is used to melt the stakes.

4. The method of claim 1 wherein the lens is an inner lens, and further comprising the step of securing an outer lens to the lamp housing such that the outer lens covers the inner lens.

5. A method of manufacturing a center high mount stop lamp (CHMSL) comprising the steps of:
    a. providing an elongated printed circuit board (PCB) with a plurality of LEDs positioned thereon, the PCB including a first plurality of holes;
    b. providing an elongated inner lens comprising a plurality of prescriptions, each of the plurality of prescriptions associated with one of the plurality of LEDs, the elongated inner lens further comprising a first plurality of stakes and a second plurality of holes;

c. providing an elongated lamp housing comprising a second plurality of stakes;

d. forming a PCB subassembly by fixing the PCB to the inner lens by inserting the first plurality of stakes on the inner lens through the first plurality of holes on the PCB and melting the first plurality of stakes; and e. fixing the PCB subassembly to the housing by inserting the second plurality of stakes on the lamp housing through the second plurality of holes on the inner lens and melting the second plurality of stakes.

6. The method of claim 5 wherein the first plurality of stakes and second plurality of stakes are melted using a heat staking process.

7. The method of claim 5 wherein the PCB subassembly is inserted into an elongated channel on the lamp housing when the PCB subassembly is fixed to the housing.

8. A center high mount stop lamp (CHMSL) comprising:

a. an elongated printed circuit board (PCB) having a plurality of LEDs positioned thereon;

b. an elongated inner lens comprising a plurality of prescriptions, each of the plurality of prescriptions associated with one of the plurality of LEDs positioned on the PCB;

c. a first plurality of stakes extending exclusively between the PCB and the inner lens, the first plurality of stakes fixing the PCB to the inner lens;

d. an elongated lamp housing connected to the inner lens;

e. a second plurality of stakes extending between the inner lens and the lamp housing, the second plurality of stakes fixing the inner lens to the lamp housing.

9. The CHMSL of claim 8 wherein the first plurality of stakes are positioned on the inner lens and extend through holes in the PCB.

10. The CHMSL of claim 8 wherein the second plurality of stakes are positioned on the lamp housing and extend through holes in the inner lens.

11. The CHMSL of claim 8 wherein the lamp housing further comprises a channel and the inner lens and PCB and positioned in the channel.

12. The CHMSL of claim 8 wherein the inner lens comprises a first plurality of tabs and the first plurality of stakes extend from the plurality of tabs.

13. The CHMSL of claim 8 wherein the first plurality of stakes are capped as the result of a heat stake process.

14. The CHMSL of claim 8 wherein the second plurality of stakes are capped as the result of a heat stake process.

15. The CHMSL of claim 8 wherein the first plurality of stakes are screws.

16. The CHMSL of claim 8 wherein the second plurality of stakes are screws.

* * * * *